United States Patent
Fieau et al.

(10) Patent No.: US 11,575,644 B2
(45) Date of Patent: Feb. 7, 2023

(54) METHOD FOR ACQUIRING A DELEGATION CHAIN RELATING TO RESOLVING A DOMAIN NAME IDENTIFIER IN A COMMUNICATION NETWORK

(71) Applicant: ORANGE, Issy-les-Moulineaux (FR)

(72) Inventors: Frédéric Fieau, Chatillon (FR); Jesús Alberto Polo Garcia, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/415,269

(22) PCT Filed: Dec. 11, 2019

(86) PCT No.: PCT/FR2019/053027
§ 371 (c)(1),
(2) Date: Jun. 17, 2021

(87) PCT Pub. No.: WO2020/128238
PCT Pub. Date: Jun. 25, 2020

(65) Prior Publication Data
US 2022/0029952 A1    Jan. 27, 2022

(30) Foreign Application Priority Data
Dec. 19, 2018 (FR) .................................... 1873343

(51) Int. Cl.
*H04L 61/4511* (2022.01)

(52) U.S. Cl.
CPC ............................... *H04L 61/4511* (2022.05)

(58) Field of Classification Search
CPC ............ H04L 61/1511; H04L 63/166; H04L 63/0272; H04L 63/0815; H04L 63/0823; H04L 67/02
See application file for complete search history.

(56) References Cited

U.S. PATENT DOCUMENTS 7,289,519 B1 * 10/2007 Liskov ................ H04L 61/4511
  709/201
8,909,736 B1 * 12/2014 Bosch ................. H04L 67/1093
  709/217
(Continued)

FOREIGN PATENT DOCUMENTS

WO    2018115647 A1    6/2018
WO    2018130796 A1    7/2018

OTHER PUBLICATIONS

International Search Report dated Mar. 26, 2020 for corresponding International Application No. PCT/FR2019/053027, dated Dec. 11, 2019.

(Continued)

*Primary Examiner* — Jimmy H Tran

(74) *Attorney, Agent, or Firm* — David D. Brush; Westman, Champlin & Koehler, P.A.

(57) ABSTRACT

A method and a device for acquiring an identifier of a data server able to deliver content to a terminal. The method is executed by the terminal, which transmits, to a resolution server of a communication architecture, a message requesting to obtain an identifier of the data server in the second domain. This request message triggers reception, from the resolution server, of an information message includes the identifier of the data server in a first domain. This message furthermore includes a delegation chain, which includes a sequence of redirections from the second domain to the first domain.

13 Claims, 4 Drawing Sheets

(56) References Cited

U.S. PATENT DOCUMENTS

| | | | | |
|---|---|---|---|---|
| 11,005,856 B2* | 5/2021 | Kaliski, Jr. | | H04L 63/126 |
| 2002/0010798 A1* | 1/2002 | Ben-Shaul | | H04L 67/1023 |
| | | | | 707/E17.116 |
| 2002/0078233 A1* | 6/2002 | Biliris | | H04L 67/1021 |
| | | | | 709/245 |
| 2003/0093523 A1* | 5/2003 | Cranor | | H04L 29/12132 |
| | | | | 709/225 |
| 2004/0044791 A1* | 3/2004 | Pouzzner | | H04L 29/12066 |
| | | | | 707/E17.115 |
| 2009/0077383 A1* | 3/2009 | de Monseignat | | H04L 9/3242 |
| | | | | 713/176 |
| 2012/0185370 A1* | 7/2012 | Davie | | G06Q 30/04 |
| | | | | 713/176 |
| 2012/0207151 A1* | 8/2012 | Alt | | H04L 65/104 |
| | | | | 370/395.54 |
| 2013/0279414 A1* | 10/2013 | Damola | | H04L 61/50 |
| | | | | 370/328 |
| 2013/0336221 A1* | 12/2013 | Damola | | H04W 40/34 |
| | | | | 370/328 |
| 2014/0237139 A1* | 8/2014 | Treuhaft | | H04L 61/4511 |
| | | | | 709/244 |
| 2015/0288647 A1* | 10/2015 | Chhabra | | H04L 67/563 |
| | | | | 709/245 |
| 2016/0380975 A1* | 12/2016 | Reddy | | H04L 61/4511 |
| | | | | 726/12 |
| 2017/0155645 A1* | 6/2017 | Wu | | H04L 61/4511 |
| 2017/0222974 A1* | 8/2017 | Cathrow | | H04L 63/1416 |
| 2017/0295132 A1* | 10/2017 | Li | | H04L 61/1511 |
| 2017/0374015 A1* | 12/2017 | Siba | | H04L 61/4511 |
| 2018/0219912 A1* | 8/2018 | Maslak | | H04L 63/0281 |
| 2018/0278572 A1* | 9/2018 | Halley | | H04L 9/40 |
| 2019/0199678 A1* | 6/2019 | Townsend | | H04L 61/4511 |
| 2019/0387264 A1* | 12/2019 | Stephan | | H04N 21/237 |
| 2020/0084083 A1* | 3/2020 | Hesketh | | H04L 61/35 |
| 2020/0195669 A1* | 6/2020 | Karasaridis | | G06N 3/088 |
| 2021/0105248 A1* | 4/2021 | Brown | | H04L 67/02 |
| 2021/0226916 A1* | 7/2021 | Maslak | | H04L 47/125 |
| 2022/0070136 A1* | 3/2022 | Fieau | | H04L 67/563 |

OTHER PUBLICATIONS

Written Opinion of the International Searching Authority dated Mar. 26, 2020 for corresponding International Application No. PCT/FR2019/053027, filed Dec. 11, 2019.

English translation of the Written Opinion of the International Searching Authority dated Apr. 1, 2020 for corresponding International Application No. PCT/FR2019/053027, filed Dec. 11, 2019.

Fieau F et al, "Limited Use of Remote Keys for Interconnected CDNs; draft-cdni-fieau-lurk-https-delegation-00.txt", Limited Use of Remote Keys for Interconnected CDNS; draft-cdni-fieau-lurk-https-delegation-00.txt, Internet Engineering Task Force, IETF; Standardworkingdraft, Internet Society (ISOC) 4, Rue Des Falaises CH—1205 Geneva, Switzerland, Jul. 8, 2016 (Jul. 8, 2016), p. 1-17, XP015114144.

Trammell Eth Zurich B, "RAINS (Another Internet Naming Service) Protocol Specification; draft-trammell-rains-protocol-03.txt", RAINS (Another Internet Naming Service) Protocol Specification; draft-trammell-rains-protocol-03.txt; Internet-Draft: Network Working Group, Internet Engineering Task Force, IETF; Standardworkingdraft, Internet Society (ISOC) 4, Rue Des-Falaises CH-, No. 3, Sep. 20, 2017 (Sep. 20, 2017), p. 1-51, XP015121907.

* cited by examiner

[Fig 1]
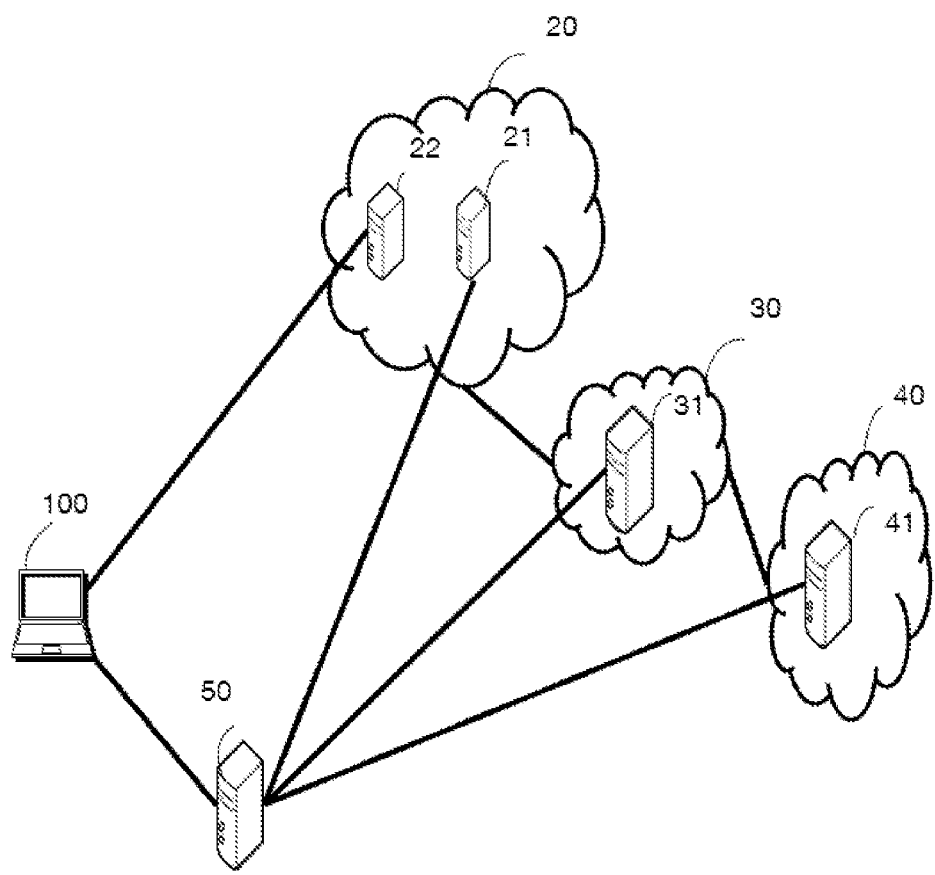

[Fig 2]
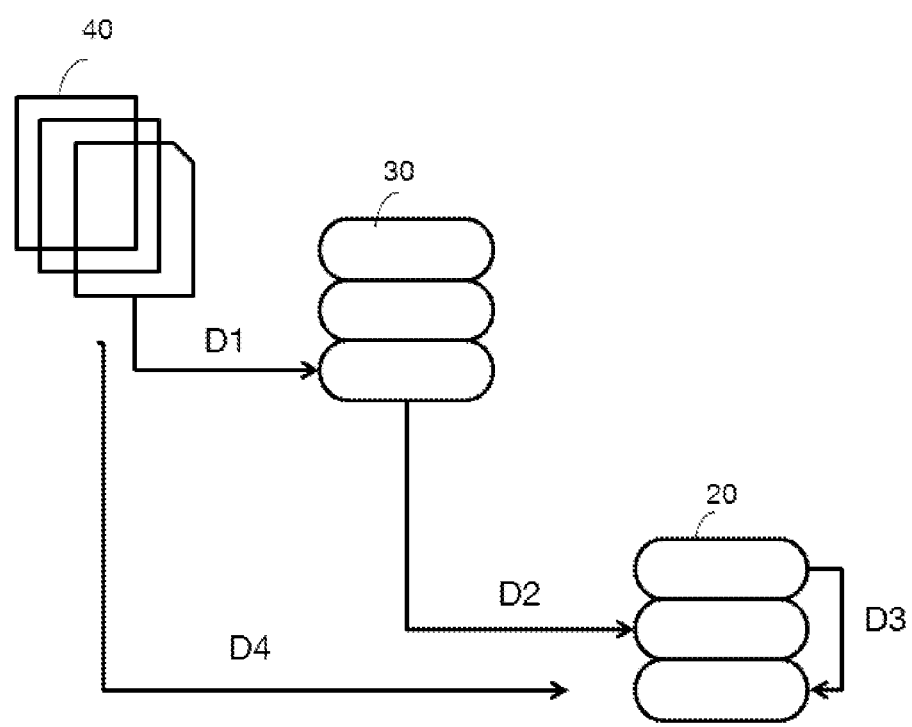

[Fig 3]
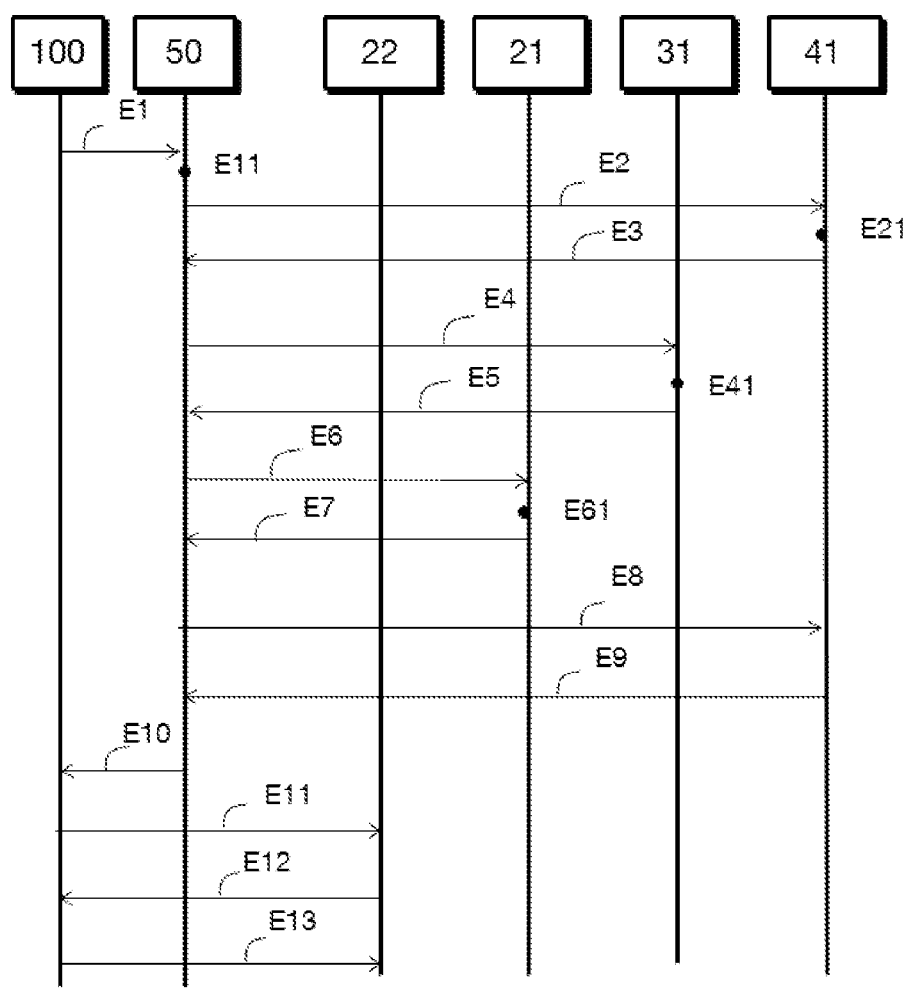

[Fig 4]
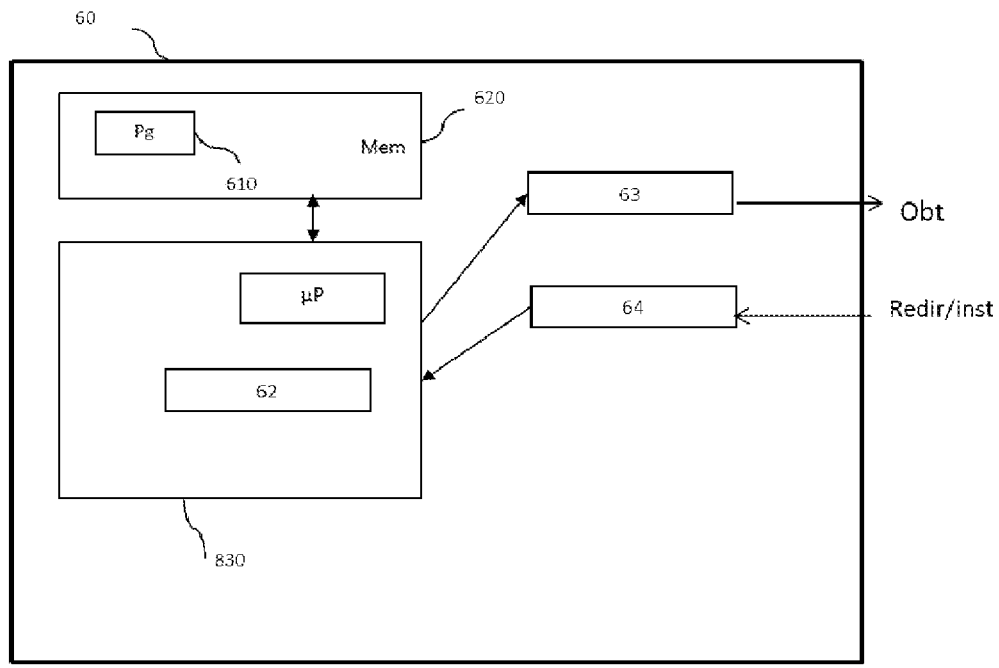
[Fig 5]
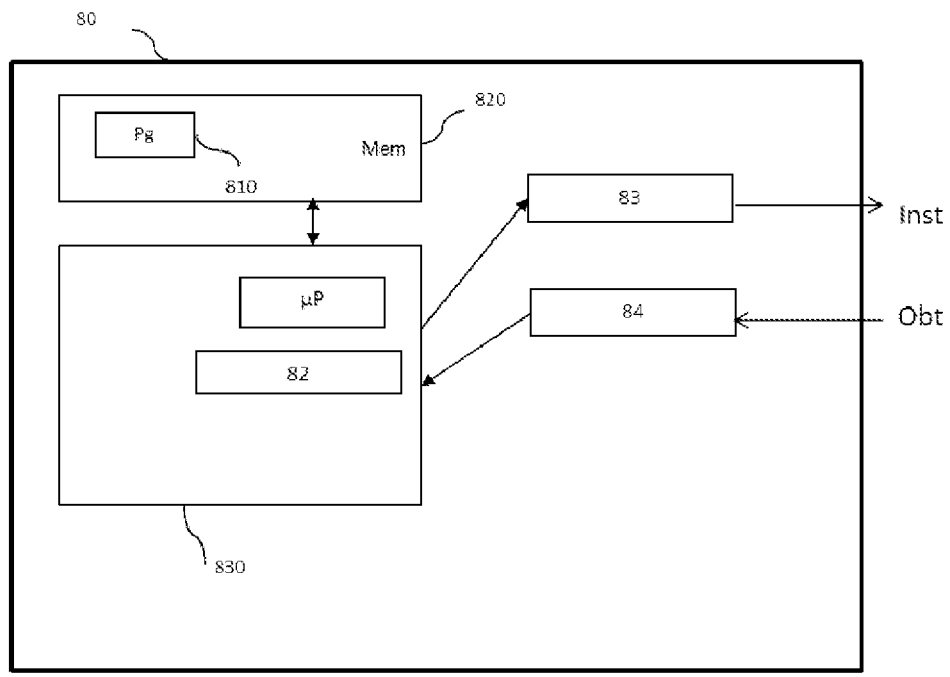

METHOD FOR ACQUIRING A DELEGATION CHAIN RELATING TO RESOLVING A DOMAIN NAME IDENTIFIER IN A COMMUNICATION NETWORK

CROSS-REFERENCE TO RELATED APPLICATIONS

This application is a Section 371 National Stage Application of International Application No. PCT/FR2019/053027, filed Dec. 11, 2019, the content of which is incorporated herein by reference in its entirety, and published as WO 2020/128238 on Jun. 25, 2020, not in English.

1. TECHNICAL FIELD

The invention relates to communication networks and aims to implement a method making it possible to implement a secure delegation from a second domain of a DNS (Domain Name Server) architecture to a first domain in order for a terminal to obtain an identifier of a data server of the first domain capable of delivering a content, the identifier being initially requested from the second domain.

2. STATE OF THE ART

In communication architectures, contents are most often distributed to the terminals from data servers which are not necessarily the so-called source servers which initially have the requested contents. For example, if a terminal wants to access the data of the page http://www.exemple.fr, then these data will probably be transmitted by a CDN server or, in other words, a cache server having obtained the data from the source server, hosting the data of the page cited above. The identifier of this CDN server then has to be transmitted to the client, the latter setting up a session with this CDN server to actually obtain the data, for example by setting up an HTTPS (HyperText Transfer Protocol Secure) session, for example of HTTP over TLS (Transport Layer Security) type. These types of architecture notably make it possible to limit accesses to the source server, to reduce the bandwidth consumption in the communication networks by bringing the data servers closer to the terminals, and to improve the quality of experience for the clients wanting to access these data.

Thus, a terminal transmitting a request in order to obtain an identifier of a data server to a DNS (Domain Name Server) server of a source domain, for example CSP.com, is redirected to a DNS server of a CDN of an operator of a communication network or of an operator of CDN servers for example, responsible for managing CDN servers capable of delivering the contents requested by the terminal. As an example, in the context of the "Edge Computing" architectures that are intended to be implemented in the fifth generation (5G) networks, the delivery of contents by servers close to the terminals makes it possible to reduce the latency relating to the distribution of the contents and therefore improve the quality of experience of the clients and improve the reliability of the data access service by distributing the servers in different domains, a domain representing a set of resources of a communication network administered by one and the same entity.

In the case of the CDN architectures, a CDN server must deliver the content by using the source domain name in order for the terminal to be able to check and ensure that the received content, which does not come from a server of the source domain, comes from a server of a domain that has an agreement with the source server. The terminal in fact compares the match between the domain requested in the DNS request initially transmitted and the information on the domain name present in a certificate sent by the data server of the CDN domain. However, for this comparison to be able to be made, the source domain must transmit the certificate to the CDN domain server together with a private key associated with the source domain. The transmission of the private key does in fact pose problems of confidentiality and of security that have to be resolved. The terminal thus obtains a content from a server of a domain for which it does not know the link with the source domain that the terminal invoked to obtain the content. The document draft-Sheffer-acme-star-delegation-01 describes a solution allowing a single delegation by a source server to a third-party server while the communication network architectures most often interconnect a large number of domains, these domains not necessarily all having agreements with the source server. A domain X involved, for example, in the delivery of a content can also have agreements with different domains, corresponding to distinct service providers, and can itself invoke another, more appropriate domain Y, to provide a data server identifier. Thus, the provision of an identifier of a data server to a terminal can involve a large number of successive domains with no a priori control of the source domain initially invoked by the terminal. The sharing of private keys between the different domains is not however desirable for security reasons and different domains can be involved in the provision of the identifier of the data server to the terminal depending on the type of data and/or the time slot, even depending on the agreements between the different domains for certain services. According to the prior techniques, it is also not possible to control the reliability of the data access service by checks before the fact, that is to say before the connection of the terminal to the data server identified in the DNS response transmitted to the terminal, or even after the fact, that is to say once the terminal is connected to the data server. The object of the present invention is to provide improvements over the state of the art.

3. SUMMARY OF THE INVENTION

The invention improves the situation using a method for acquiring an identifier of a data server capable of delivering a content to a terminal, the method being executed by the terminal and comprising a step of reception, from a resolution server of a communication architecture, of an information message comprising the identifier of the data server in a first domain, and further comprising a delegation chain, including at least one redirection from a second domain to the first domain, the reception of the information message being triggered by a step of transmission, to the resolution server, of a message requesting to obtain an identifier of the data server in the second domain.

The provision of a content to a terminal most often requires the contribution of name servers (DNS servers) of different domains which will be redirected in succession a DNS request as far as a name server of a domain capable of transmitting an identifier of the data server to which the terminal will have to connect to obtain the content. Among the name servers involved in the provision of an identifier of the data server, it is possible to identify DNS servers of CDN domains of operators involved in the management of the communication network and CDN domains of CDN solution providers. By knowing the entire delegation chain, comprising the successive delegations from one name server to another name server, from the server of the source domain, initially invoked by a resolution server that the terminal has invoked via a request to obtain a data server identifier, to the delivery server of the domain at the end of the delegation chain, the terminal can ensure that the content which will be delivered does actually initially originate from a server of a domain approved step-by-step in the chain. The terminal can also ensure that the data server is indeed authorized to provide the content, in accordance with the information present in the delegation chain. The delegation chain in fact corresponds to a series of redirections from the source domain server, or second domain, to the domain actually containing the data server capable of delivering the content to the terminal. The number of redirections and of intermediate domains between the chain start domain, that is to say the source domain, and the chain end domain, that is to say comprising the delivery server, is not limited. A domain corresponds to a set of devices sharing directory information. It can be a geographic domain or a logical domain and each domain can itself comprise subdomains, thus creating a hierarchical organization of the domain names, such as that used for the DNS service. A redirection between domains consists in transmitting a request to obtain a server identifier to another domain, these exchanges being performed between name servers.

The acquisition method also presents the advantage of being able to inform the terminal on the different domains and therefore actors involved in the provision of the content before even requesting the content. The method thus makes it possible to be able to inform the terminal before a request to obtain the content is actually transmitted. The terminal holds all the information on the delegations between domains before actually transmitting a request to obtain the content and it can, if necessary, not request the content if one of the delegations of the chain does not suit it.

The acquisition method can thus be used for different protocols then using the delegation chain received by the terminal. Thus, the HTTP over TLS protocols or the services relating to edge caching, that make it possible to deliver contents as close as possible to the terminals, can apply the method.

The acquisition method also dispenses with the sending of a private key relating to a second domain to a first domain, since the delegation chain indicates that the second domain implicitly authorizes the delivery server of the first domain to deliver the content and therefore represents an alternative to private key sharing which poses security problems. The obtaining of the information on successive delegations between domains, described in the delegation chain, when the identifier of the data server delivering the requested content is obtained, also makes it possible to be able to use the information on the chain for successive requests to obtain content, possibly based on distinct communication protocols. The method can possibly be implemented from exchanges relating to the DNS protocol that is widely used in communication networks.

According to one aspect of the invention, the request message of the acquisition method comprises a delegation parameter. The sending of a delegation parameter by the terminal in the obtaining request message makes it possible to transmit or not transmit the delegation chain to the terminal, or else differentiate the obtaining requests limiting the exchanges necessary to the generation of the chain and/or to the obtaining thereof, even allowing for an implementation of a resolution architecture suited to the provision of a delegation chain.

According to another aspect of the invention, in the acquisition method, the delegation chain comprises a chain validity time.

The method offers the benefit of being able to implement the delegation chain for a limited time. That makes it possible to improve the security of the delegation by avoiding allowing a corrupted domain to be able to, for example, remain continuously in a chain obtained by a terminal. The validity time also makes it possible to oblige the terminal to implement, regularly, that is to say when the validity time has expired, the method for obtaining updates of the delegation chain.

According to another aspect of the invention, in the acquisition method, the delegation chain comprises a chain authentication datum.

The delegation chain advantageously comprises a chain signature datum, for example to authenticate the domain redirecting to another domain, and, possibly, the algorithm used to check the delegation chain, or any other authentication information, added by a server of the chain and allowing the terminal to authenticate a server added into the delegation chain. Notably, each domain present in the chain attaches a certificate to the generated delegation chain, the certificate being possibly valid for a determined time.

According to another aspect of the invention, in the acquisition method, the delegation chain comprises at least one redirection to at least one third intermediate domain.

The acquisition method is advantageously implemented when the communication architecture in which it is implemented comprises at least 3 domains and at least two redirections between distinct domains are contained in the delegation chain transmitted to the terminal. Each domain can thus use the information of the chain to redirect a request to obtain an identifier to another domain.

According to another aspect of the invention, the acquisition method further comprises a step of transmission of a connection setup message to the identifier of the data server in the first domain, the setup message comprising the delegation chain.

The terminal can advantageously use the information relating to the delegation chain to set up a connection with the delivery server in order to obtain the requested content. In fact, once it has obtained the identifier of the delivery server responsible for the provision of the content, it can directly set up a connection with this server to obtain the content. The addition of the delegation chain in the connection setup message makes it possible to inform the delivery server that it has obtained this chain and that it possibly validates the received delegation chain in the information message.

According to another aspect of the invention, the acquisition method further comprises a step of reception of a connection acceptance message from the data server.

A step of reception of a connection acceptance message from the data server allows the latter to validate (or invalidate) the setting up of the connection and the delegation chain which has been transmitted in the connection setup message.

According to another aspect of the invention, in the acquisition method, the connection setup message further comprises an identification datum of the second domain.

The terminal having initially requested an identifier of a server of the second domain, it can advantageously add into the connection setup message, an identification datum of the second domain. This information allows the delivery server of the first domain to make the link between the setting up of the connection and the chain.

According to another aspect of the invention, the acquisition method further comprises a step of reception, from the data server, of a message communicating at least one certificate associated with the delegation chain.

The communication of certificates associated with the domains present in the delegation chain, and therefore involved in the delivery of the requested content is of interest. The presence of the certificate of the second domain then allows the terminal to complete the setting up of the secure session with the delivery server.

The various aspects of the acquisition method which have just been described can be implemented independently of one another or in combination with one another.

The invention relates also to a method for associating a delegation chain with an information message comprising an identifier of a data server, capable of delivering a content to a terminal, the method being executed by a resolution server of a communication architecture and comprising the following steps:

- reception, from the terminal, of a message requesting to obtain an identifier of the data server in a second domain,
- determination of a delegation chain, comprising at least one redirection from the second domain to a first domain,
- transmission of an information message, to the terminal, comprising the identifier of the data server in the first domain, said information message further comprising the determined delegation chain.

The invention relates also to a device for acquiring an identifier of a data server capable of delivering a content to a terminal, comprising:

- a receiver, capable of receiving, from a resolution server of a communication architecture, an information message comprising the identifier of the data server in a first domain, and further comprising a delegation chain, including at least one redirection from a second domain to the first domain,
- a transmitter, capable of transmitting, to the resolution server, a message requesting to obtain an identifier of the data server in the second domain and of triggering the reception of the information message.

This device, capable in all its embodiments of implementing the acquisition method which has just been described, is intended to be implemented in a terminal, such as a mobile terminal (smartphone, tablet, etc.) or a fixed terminal, such as a computer or even an access unit of a domestic or professional network (box).

The invention relates also to a device for associating a delegation chain with an information message comprising an identifier of a data server capable of delivering a content to a terminal, implemented in a communication architecture and comprising:

- a receiver, capable of receiving, from the terminal, a message requesting to obtain an identifier of the data server in a second domain,
- a determination module, capable of determining a delegation chain, comprising at least one redirection from the second domain to a first domain,
- a transmitter, capable of transmitting an information message to the terminal, said message comprising the identifier of the data server in the first domain, and further comprising the determined delegation chain.

This device, capable of implementing the association method which has just been described, is intended to be implemented in a name resolver, for example a DNS resolver, and can be instantiated in a terminal, fixed or mobile, or even in an access unit of a domestic or professional network (box) or else in a specific unit of an operator network.

The invention relates also to a system for acquiring an identifier of a data server comprising:

- a device for acquiring an identifier of a data server,
- a device for associating a delegation chain.

The invention relates also to computer programs comprising instructions for the implementation of the steps of the respective acquisition and association methods which have just been described, when these programs are executed by processors and storage media that can be read by respective acquisition and association devices on which the computer programs are stored.

These programs can use any programming language, and be in the form of source code, object code, or of intermediate code between source code and object code, such as in a partially compiled form, or in any other desirable form.

The invention also targets an information medium that can be read by a computer, and comprising computer program instructions as mentioned above.

The information medium can be any entity or device capable of storing programs. For example, the medium can comprise a storage means, such as a ROM, for example a CD ROM or a microelectronic circuit ROM, or even a magnetic storage means, for example a diskette (floppy disc) or a hard disk.

Also, the information medium can be a transmissible medium such as an electrical or optical signal, which can be conveyed via an electrical or optical cable, wirelessly or by other means. The programs according to the invention can in particular be downloaded over a network of internet type.

Alternatively, the information medium can be an integrated circuit in which the programs are incorporated, the circuit being adapted to execute or to be used in the execution of the methods concerned.

4. BRIEF DESCRIPTION OF THE DRAWINGS

Other advantages and features of the invention will become more clearly apparent on reading the following description of a particular embodiment of the invention, given as an illustrative and nonlimiting example, and the attached drawings, in which:

FIG. 1 presents a simplified view of a communication architecture in which the invention is implemented according to one aspect of the invention, FIG. 2 presents the generation of a delegation chain, comprising a set of redirections, according to one aspect of the invention, FIG. 3 presents an overview of the method for acquiring an identifier of a data server according to one embodiment of the invention, FIG. 4 presents an example of structure of an acquisition device according to one aspect of the invention, FIG. 5 presents an example of structure of an association device according to one aspect of the invention.

5. DESCRIPTION OF THE EMBODIMENTS

Hereinafter in the description, embodiments of the invention are presented in a communication infrastructure. This infrastructure can be fixed or mobile and the invention can be intended for the acquisition of an identifier of a data server for enterprise clients or for so-called residential clients or the general public.

Reference is made first of all to FIG. 1 which presents a simplified view of a communication architecture in which the invention is implemented according to one aspect of the invention.

A terminal 100, which can be a fixed terminal or a mobile terminal, wants to obtain a content from a remote server by using the HTTPS protocol. For example, the content of the remote server is as follows: https://www.abc.com. The terminal 100 therefore transmits a resolution request for the name https://www.abc.com to obtain a network identifier, for example an IP (Internet Protocol) address of IPv4 or IPv6 type, corresponding to this name. The terminal 100 therefore invokes a resolution server 50 to obtain the network identifier of the server storing the content. The request to obtain the identifier of the source server sent by the terminal 100, according to one alternative, can comprise a delegation parameter indicating notably that the terminal 100 supports the "delegation" function and ordering the resolution server 50 to request the information relating to the delegation. The resolution server 50 is, for example, a device of "DNS (Domain Name System) resolver" type. This DNS resolver can be incorporated in the terminal 100 or else be implemented in a local area network to which the terminal 100 is attached, or even operated by an operator managing the access network to which the terminal 100 is attached. The resolution server 50, not having a record associating a network identifier with the name, corresponding in this case to an address, initiates a redirection method in order to establish a delegation chain to obtain the identifier of a data server hosting the content. It invokes a name server 41, for example a DNS server, of the source domain 40 abc.com to obtain the network identifier by transmitting a request message comprising the delegation parameter received from the terminal 100. The resolution server 50, according to one example, may have been redirected to the name server 41 of the source domain after having transmitted a request allowing it to obtain an identifier of the name server 41 from other servers, such as so-called root servers and/or servers of the .com domain before actually being able to contact the name server 41.

It is considered in this request that the content https://www.abc.com is replicated in so-called local servers allowing the terminals to access the replicated content with a lesser latency and allowing a lesser consumption of the communication resources. The server 41 determines another domain 30 to which to redirect the resolution server 50. The name server 41 responds to the resolution server 50 by transmitting an instruction message indicating that the IP address of a server storing the content can be obtained by transmitting a request to a name server 31 of the domain 30. The redirection message thus comprises a delegation chain indicating the redirection by the domain 40 to the domain 30. On reception of this redirection message, the resolution server 50 transmits a message requesting to obtain the identifier of a server storing the content https://www.abc-.com to the name server 31 of the domain 30. This request further comprises the delegation chain received from the server 41. The server 31 responds to the resolution server 50 by redirecting it to the name server 21 of the domain 20 after having modified the delegation chain with the added new redirection from the domain 30 to the domain 20. This modified chain is also transmitted to the domain 20.

The resolution server 50 then invokes the name server 21, in accordance with the redirection obtained previously, by attaching the modified chain, to obtain the content https://www.abc.com. Since the server 21 knows the IP address of a server 22 in the domain 20 that hosts the content requested by the terminal 100, it communicates it to the resolution server 50 in an instruction message further comprising the complete delegation chain from the source domain 40 to the domain 20, that is to say from the domain 40 to the domain 30 then from the domain 30 to the domain 20, in which the data server 22 capable of delivering the content to the terminal 100 is located.

The resolution server 50 transmits this information message to the terminal 100 which then obtains the IP address of the data server 22 to which to transmit a request to obtain the content and the complete delegation chain received from the resolution server 50. The terminal 100, according to one example, then transmits a connection setup message, such as a message of HTTP/TLS (Transport Layer Security) type to the server 22, this message comprising the received delegation chain. The server 22, in return, transmits a connection acceptance message originating from the server 22 delivering the content to the terminal 100.

Concerning FIG. 2, the generation of a delegation chain is presented, comprising a series of redirections, according to one aspect of the invention.

In this figure, the three domains 20, 30, 40 presented in FIG. 1 are also represented. It is considered in this embodiment that the three domains 20, 30, 40 correspond to CDN (Content Delivery Network) networks, but they could also be operator networks or even storage (cloud) infrastructures located at different locations. The domain 40 comprises a data server of which one terminal, not represented in this figure, wants to obtain the identifier to then request data from this server.

The identifier of the data server of the domain 40 is not transmitted to the terminal but a series of redirections will be applied between the different domains 40, 30, 20 for a data server, closer to the terminal and/or more powerful to satisfy the request from the terminal and/or having more resources to transmit the data to the terminal, to be identified and transmitted to the terminal. In the present case, an identifier of a data server of the CDN domain 20 will be transmitted to the terminal. A series of redirections from the domain 40 to the domain 20 must be put in place transparently for the terminal which has to be able to check and adapt its behavior according to the redirections. According to one alternative, the domain 40, called source domain, can also validate or not validate the different redirections, for example according to agreements with the different domains present in the chain which comprises the successive redirections. This FIG. 2 presents the redirections of a delegation chain and the different information potentially present in the chain but does not present the exchanges with a resolution server. FIG. 2 presents a summary view of a redirection method between domains, the elements D1, D2, D3, D4 not representing exchanges between the domains 40, 30, 20 but the principle of generation of a delegation chain from the successive redirection information.

Upon the reception, by a name server of the domain 40, of a request to obtain the identifier (name, IP address, etc.) of a data server hosting a content desired by a terminal, the name server (DNS) can indicate the identifier of a data server (HTTP server, FTP (File Transfer Protocol) server, etc.) of the domain 40 or else redirect the resolution server, the agent of the terminal for obtaining the identifier, to a name server of another domain. This second option is used by the DNS server of the domain 40 which delegates, to a DNS server of the domain 30, the provision of an identifier of the data server. The domain 40 delegates to the domain 30 the response to the request to obtain the identifier sent by the resolution server. And, the domain 30 does the same to delegate to the domain 20 the response to be transmitted to the resolution server thus contributing to the generation of the delegation chain. In FIG. 2, D1 comprises delegation information from the domain 40 to the domain 30, this information being transmitted to the resolution server, and D2 comprises delegation information from the domain 30 to the domain 20, also transmitted to the resolution server. The chain comprises the complete delegation information D4 from the domain 40 to the domain 20 including the information D1 and D2 and possibly the redirection information D3 from the domain 20 to itself. The delegation chain can thus comprise a large quantity of successive delegation information. The complete chain, when it comprises the delegation information D3 from the domain 20 to itself allows the resolution server to identify the end of the delegation chain in order to facilitate future processing operations and thus indicate that the chain is complete. A name server of a domain thus indicates another domain that the resolution server must invoke, after having modified the delegation chain with the addition of a redirection to the domain that the resolution server must invoke.

To obtain the complete delegation chain, it is necessary to interrogate a name server of all the domains involved in the DNS resolution ultimately making it possible to obtain the identifier of the data server. The delegation chain D1 comprises, according to one example, a set of elements corresponding to a block, such as From: name of the delegating domain—CDN1 40
To: name of the delegated domain—CDN2 30
Start_time: start time of the delegation (UTC time)
Validity: time in seconds from Start_time
signature_algorithm: signature hash+algorithm—name of the algorithm used to check the delegation chain. The possible values are identified in the document IETF RFC 8446 section 4.2.3
Signature: contains the signature with a certificate used to authenticate the name of the domain present in the "From" field.

The signature field, added according to one alternative, makes it possible to prove the authenticity of each redirection of a delegation chain, implicitly by checking the content and the identity of the signature. It is applied iteratively when a new redirection is added to an existing chain. This new block, corresponding to a delegation from one domain to another, acknowledges the preceding delegation and proves the authenticity of the new one. The private key used to sign each block is that of the certificate of the domain which is delegating (From field). It should be noted that redirection information is composed of the information from the "from" and "to" fields of a block.

The information of the chain D4 therefore comprises the 2 data blocks D1 and D2 corresponding to the successive delegations from the domain CDN1 40 to the domain CDN2 30 then from the domain CDN2 30 to the domain CDN3 20 and possibly a third data block D3 corresponding to a delegation from the domain CDN3 20 to itself.

The redirection information of the blocks, therefore the "From" and "To" fields, must be present whereas the other information blocks, relating to the delegation time and security, are optional. The chains, composed of blocks, are received by the name servers of the domains, from a resolution server, then modified by adding a block comprising a redirection and possibly a lifetime of the chain and also a signature, then returned to the resolution server. Thus, the resolution server invokes a name server of the domain 40, receives in return a redirection message comprising a delegation chain comprising redirection information D1 to the domain 30. The resolution server transmits a message to obtain the identifier of the data server, comprising the received chain, to a name server of the domain 30. This name server, not being in a domain comprising an identifier of the data server, identifies a domain to which to redirect the resolution server, and modifies the chain by adding the data block D2. It sends the chain (D1+D2) in an instruction message to the resolution server. The resolution server invokes a name server of the domain 20. The domain 20 comprising a data server, the name server modifies the received chain by adding the block D3 and transmits the modified chain, comprising the data blocks D1, D2, D3 to the resolution server.

Reference is now made to FIG. 3 which presents an overview of the method for acquiring an identifier of a data server according to one embodiment of the invention.

In the step E1, the terminal 100 transmits a message requesting to obtain an identifier of a data server, represented here by a DNS request, to the device 50 which is of DNS resolver type. This DNS request is sent by the terminal 100 to know the identity of a data server in a given domain capable of delivering a content requested by the terminal 100. The DNS request is, for example, of "DNS Query A cdn.co.com" type and the terminal wants to obtain an IP address corresponding to the type A (address) record of the domain name cdn.co.com. According to one example, this request comprises a delegation parameter, for example an empty delegation chain Delegation ( ), because no delegation has taken place for the time being. The DNS resolver 50 can be in the terminal 100, in a local area network to which the terminal 100 is attached or even in a network managed by an operator.

In the step E11, the DNS resolver 50 puts in place a process for determining a delegation chain associated with the acquisition of the identifier of the data server requested by the terminal 100. This determination is an iterative process between the DNS resolver 50 and the different name servers of the domains involved in the redirections contained in the delegation chain.

The DNS resolver, following the request transmitted by the terminal 100 in the step E1, transmits a message requesting an identifier of a data server corresponding to cdn.co.com in the step E2. This message is in fact transmitted to a so-called authority DNS server for the domain cdn.co.com. Knowing that cdn.co.com contains at least three domains, namely the domains .com, co.com and cdn.co.com, the DNS resolver 50 can invoke an authority DNS server of the domain .com then an authority DNS server of the domain co.com before invoking a DNS server of the domain cdn.co.com. In the example of FIG. 3, only the sending of the request message to a DNS server 41 of the domain cdn.co.com is represented. In the step E2, the DNS server 41, is identified as the source server because it is the first DNS server invoked by the DNS resolver 50 to obtain the identifier of a data server. The DNS resolver 50 includes an empty delegation chain, possibly received from the terminal 100, in the request message transmitted to the DNS server 41. The DNS resolver 50 transmits the following message:

---

DNS query A cdn.co.com
Extension: Delegation ( )

---

In the step E21, the DNS server 41 modifies the delegation chain by adding a redirection from the domain cdn.co.com to the domain co.cdn1.com. In the step E3, the DNS server 41, having determined a domain to which the DNS resolver 50 must be redirected and after having modified the chain accordingly in the step E21, sends a redirection message to the DNS resolver 50 to indicate to it that the content can be obtained from the domain co.cdn1.com. It thus creates the first level of delegation to co.cdn1.com and has therefore modified the delegation chain by adding a data block to the delegation chain received in the step E2. This is the first occurrence of the delegation chain, this occurrence corresponding to a redirection from the domain cdn.co.com to the domain co.cdn1.com. This chain can, according to one example, comprise a chain validity time. According to another example, the chain can further comprise a chain authentication datum, such as a certificate of the server 41. The redirection message is a message of DNS CNAME (Canonical Name) type indicating to the resolver 51 to invoke an authority DNS server of the domain cdn1.co.com. The content of the redirection message transmitted by the server 41 to the DNS resolver 50 is as follows:

```
DNS answer CNAME co.cdn1.com
Extension: Delegation (
    from: cdn.co.com,
    to: co.cdn1.com,
)
```

The name server 41 has thus implemented a method for modifying the delegation chain with a redirection from the domain cdn.co.com to the domain co.cdn1.com.

On reception of the redirection message, the DNS resolver 50 transmits, in the step E4, to an authority DNS server 31 of the domain cdn1.co.com, a message requesting the identifier of the domain indicated by the DNS server 41 in its redirection message. This request message comprises the delegation chain updated by the server 41 in the step E21. The content of the message transmitted by the resolution server 50 is as follows:

```
DNS query A co.cdn1.com
Extension: Delegation (
    from: cdn.co.com,
    to: co.cdn1.com,   )
```

Determining that the DNS server 31 has a record co.cdn2.com to which the DNS resolver 50 must be redirected to obtain an identifier of a data server, the DNS server 31 in the step E41, modifies the delegation chain received in the step E4 with a redirection from co.cdn1.com to co.cdn2.com. The DNS server 31 of the domain co.cdn1.com transmits an instruction message, corresponding to a redirection, to the DNS resolver 50, this message comprising the delegation chain modified with the addition of the redirection from the domain co.cdn1.com to the domain co.cdn2.com. The modification of the chain in the step E41, according to one example, also comprises a step of validation of the received chain "from: cdn.co.com to: co.cdn1.com" for example by checking the authenticity of a certificate added by the server 41 of the domain cdn.co.com and a step of signing of the modified chain by signing the data block added to the delegation chain with a private key specific to the server 31. The content of the message transmitted by the server 31 in the step E5 is as follows:

```
DNS answer CNAME co.cdn2.com
Extension: Delegation (
    from: cdn.co.com,
    to: co.cdn1.com
    from: co.cdn1.com,
    to: co.cdn2.com,)
```

In the same way as in the step E4, the DNS resolver 50, in the step E6, transmits a message requesting an identifier of the data server in the domain cdn2.co.com to a DNS server 21 of the domain co.cdn2.com. The request message comprises the delegation chain modified by the server 31 and the content of the message is as follows:

```
DNS query A co.cdn2.com
Extension: Delegation (
    from: cdn.co.com,
    to: co.cdn1.com,
    from: co.cdn1.com,
    to: co.cdn2.com,)
```

The DNS server 21 is able to indicate an identifier of a data server in the domain co.cdn2.com to the DNS resolver 50. In the step E7, it therefore decides to send an instruction message, in this case a DNS response message comprising the IP address of the data server 22 and the delegation chain modified in the step E61 with the addition of a delegation from the domain co.cdn2.com to itself. The DNS server 21 in fact adds, to the chain received from the DNS resolver 50, a redirection from the domain co.cdn2.com to itself, thus indicating the end of the delegation chain to the devices operating this chain. The message transmitted in the step E7 by the DNS server 21 to the DNS resolver 50 is as follows:

```
DNS answer A IP@co.cdn2.com
Extension: Delegation (
    from: cdn.co.com,
    to: co.cdn1.com, ,
    from: co.cdn1.com,
    to: co.cdn2.com, ,
    from: co.cdn2.com,
    to: co.cdn2.com)
```

The DNS resolver 50 knows, upon reception of the instruction message, the domain co.cdn2.com responsible for the delivery of the content and the identifier, in this case the IP address, of the server 22 of the domain co.cdn2.com responsible for the delivery of the content.

According to one alternative, the DNS resolver 50, in the step E8, transmits, to the DNS server 41 of the domain cdn.co.com, a control message comprising the delegation chain modified by the server 21. The message transmitted by the DNS resolver 50 is as follows:

```
DNS query CNAME cdn.co.com
Extension: Delegation (
    from: cdn.co.com,
    to: co.cdn1.com,
    from: co.cdn1.com,
    to: co.cdn2.com,
    from: co.cdn2.com,
    to: co.cdn2.com,   )
```

According to one example, the server 41 can validate or invalidate the generated delegation chain. Thus, if a domain of the chain does not have an agreement with the domain cdn.co.com and/or if a domain is not secure, then the DNS server 41 can invalidate the chain and, in the step E9, send a chain invalidation message, comprising, for example, a parameter indicating that the delegation chain is not valid. On reception of this message indicating that the delegation chain is not valid, the DNS resolver 50 can transmit, to the name DNS server 41, a new request to obtain the identifier of a data server in the domain cdn.co.com with the chain invalidity parameter thus indicating to the name server 41 either to transmit a new redirection or to transmit to the name resolver 50 an identifier of a name server of the domain cdn.co.com without redirection. According to another example, if the DNS server 41 validates the chain, it transmits a validation message to the DNS resolver 50. This validation message, to indicate the validation of the chain, comprises, according to one alternative, a redirection from the domain cdn.co.com to the domain cdn2.co.com. The validation message then takes the following form:

```
DNS query CNAME cdn.co.com
Extension: Delegation (
   from: cdn.co.com,
   to: co.cdn1.com,
   from: co.cdn1.com,
   to: co.cdn2.com,
   from: co.cdn2.com,
   to: co.cdn2.com,
   from: cdn.co.com,
   to: co.cdn2.com, )
```

The resolver 50 next transmits to the terminal 100 an information message comprising the identifier of the data server 22. This is, in this example, a DNS message comprising the IP address of the data server 22 and further comprising the delegation chain generated and possibly approved by the server 41.

The message received by the terminal 100 in the step E9 is as follows:

```
DNS answer A IP@co.cdn2.com
Extension: Delegation (
   from: cdn.co.com,
   to: co.cdn1.com,
   from: co.cdn1.com,
   to: co.cdn2.com,
   from: co.cdn2.com,
   to: co.cdn2.com,
   from: cdn.co.com,
   to: co.cdn2.com,    )
```

The DNS resolver has thus implemented a redirection method making it possible to establish the delegation chain that has made it possible to determine and transmit to the terminal 100 the identifier of the data delivery server 22. The delegation chain comprises the successive redirections between domains. The chain transmitted to the terminal 100, according to one example, comprises a chain validity time.

The terminal 100, once it holds this information (IP address of the data server 22, redirections and optional parameters of the delegation chain) can, according to one alternative, set up a connection with the data server 22. In the step E11, the terminal 100, according to one example, sets up a TLS connection with the data server 22 whose IP address is specific to the domain co.cdn2.com, which was transmitted in step E10, by transmitting a TLS Client Hello message. The SNI (Server Name Indication) extension of the TLS client Hello message comprises, according to one example, the domain name cdn.co.com because it is the domain initially invoked by the terminal 100. The TLS Client Hello message further comprises the delegation chain received from the DNS resolver 50, thus indicating to the data server 22 that the terminal 100 is invoking it in accordance with a delegation chain received, and possibly approved, by the domain cdn.co.com, the DNS resolver 50 and the terminal 100. The content of the TLS Client Hello message is as follows:

```
TLS ClientHello
Extension: Server Name Indication (cdn.co.com)
Extension: Delegation (
   from: cdn.co.com,
   to: co.cdn1.com,
   from: co.cdn1.com,
   to: co.cdn2.com,
   from: co.cdn2.com,
   to: co.cdn2.com,
   from: cdn.co.com,
   to: co.cdn2.com)
```

In the step E12, the data server 22 transmits a connection acceptance message to the terminal 100. For example it transmits a TLS Server Hello message to the terminal 100.

In the step E13, according to one example, the data server 22 sends a message communicating at least one certificate associated with the delegation chain to the terminal 100. This message is, for example, a TLS ServerCertificate message containing a certificate of the domain cdn.co.com and the complete path of the certificate corresponding to the successive validations of the domains of the delegation chain. It adds a certificate for co.cdn2.com, and the delegation chain proving the delegation. Thus, the terminal 100 has a certificate of the domain co.cdn2.com, a delegation chain indicating the successive redirections between domains and a series of certificates ensuring the authenticity of the domains of the chain. The terminal can therefore, in complete security, use the certificate of the domain co.cdn2.com for the subsequent exchanges between the terminal 100 and the data server 22 and notably for the exchanges relating to the exchanges of data encryption keys.

The TLS serverCertificate message comprises, for example, the following information:

```
TLS ServerCertificate
Certificate: cdn.co.com
Certificate: co.cdn2.com
Extension: Delegation (
   from: cdn.co.com,
   to: co.cdn1.com,
   from: co.cdn1.com,
   to: co.cdn2.com,
   from: co.cdn2.com,
   to: co.cdn2.com,
   from: cdn.co.com,
   to: co.cdn2.com,    )
```

In the future TLS exchanges, the terminal 100 will thus be able to use the certificate of the delegated domain, co.cdn2.com, for the "TLS Handshake" exchanges instead of the certificate of the source domain cdn.co.com.

The invention has thus made it possible to delegate the provision of an identifier of a data server to a terminal, the data server being in a domain distinct from the domain initially invoked by the terminal, by successive redirections between intermediate domains. These redirections form a delegation chain generated by successive iteration between a resolution server and name servers of the different domains involved in the provision. The invention thus makes it possible to implement a dynamic and secure delegation between domains without requiring the exchange of private keys between the domains. The invention in fact makes it possible for the different domains to be able to be involved in the method of redirection by the resolution server 50 without prior agreements, each of the domains determining, with each of the redirections, the next domain of the chain and modifying the delegation chain accordingly, until one domain decides or is able to transmit the identifier of the data server in its domain to the resolution server 50. The terminal can thus then use the information of the chain and the authentication data of the information of the chain to establish a secure session to the domain ultimately indicated in the chain.

It should be noted that, in FIG. 3, the information present in the delegation chain only comprises the redirections between domains, but the chain can comprise additional data relating to the lifetime of the chain, to the security data relating to the chain, in accordance with the information of the data blocks presented in FIG. 2.

In relation to FIG. 4, an example of structure of an acquisition device is presented, according to one aspect of the invention.

The acquisition device 60 implements the acquisition method, of which various embodiments have just been described.

Such a device 60 can be implemented in a terminal, such as a mobile terminal (smartphone, tablet, etc.) or a fixed terminal, such as a computer or even an access unit of a domestic or professional network (box).

For example, the device 60 comprises a processing unit 630, equipped for example with a microprocessor pP, and driven by a computer program 610, stored in a memory 620 and implementing the charging method according to the invention. On initialization, the code instructions of the computer program 610 are, for example, loaded into a RAM memory, before being executed by the processor of the processing unit 630.

Such a device 60 comprises:
- a receiver 64, capable of receiving, from a resolution server of a communication architecture, an information message Info comprising the identifier of the data server in a first domain, and further comprising a delegation chain, including at least one redirection from a second domain to the first domain,
- a transmitter 63, capable of transmitting, to the resolution server, a message requesting to obtain an identifier of the data server in the second domain and of triggering the reception of the information message.

In relation to FIG. 5, an example of structure of an association device is presented, according to one aspect of the invention.

The association device 80 implements the association method, of which various embodiments have just been described.

Such an association device 80 can be implemented in a name resolver, for example a DNS resolver, and can be instantiated in a terminal, fixed or mobile, or else in an access unit of a domestic or professional network (box) or even in a specific unit of an operator network.

For example, the device 80 comprises a processing unit 830, equipped, for example, with a microprocessor pP, and driven by a computer program 810, stored in a memory 820 and implementing the charging method according to the invention. On initialization, the code instructions of the computer program 810 are, for example, loaded into a RAM memory, before being executed by the processor of the processing unit 830.

Such an association device 80 comprises:
- a receiver 84, capable of receiving, from the terminal, a message requesting to obtain an identifier of the data server in a second domain,
- a determination module 82, capable of determining a delegation chain comprising at least one redirection from the second domain to a first domain,
- a transmitter 83, capable of transmitting an information message to the terminal, said message comprising the identifier of the data server in the first domain, and further comprising the determined delegation chain.

Although the present disclosure has been described with reference to one or more examples, workers skilled in the art will recognize that changes may be made in form and detail without departing from the scope of the disclosure and/or the appended claims.

The invention claimed is:

1. A method for acquiring a network identifier of a data server capable of delivering a content to a terminal, the method being executed by the terminal and comprising acts of:
   receiving an information message from a resolution server of a communication architecture, the resolution server being a server that is able to transmit to the terminal the network identifier corresponding to a name of the data server, the information message comprising the network identifier of the data server in a first domain, and further comprising a delegation chain, determined by the resolution server, including at least one redirection from a second domain to the first domain, the at least one redirection having been received by the resolution server from a name server of the second domain, and
   triggering the receiving of the information message by transmitting to the resolution server, a message requesting to obtain the network identifier of the data server in the second domain.

2. The acquisition method as claimed in claim 1, in which the request message comprises a delegation parameter.

3. The acquisition method as claimed in claim 1, in which the delegation chain comprises a chain validity time.

4. The acquisition method as claimed in claim 1, in which the delegation chain comprises a chain authentication datum.

5. The acquisition method as claimed in claim 1, in which the delegation chain comprises at least one redirection to at least one third intermediate domain.

6. The acquisition method as claimed in claim 1, further comprising transmitting a connection setup message to the network identifier of the data server in the first domain, the setup message comprising the delegation chain.

7. The acquisition method as claimed in claim 6, further comprising receiving of a connection acceptance message from the data server.

8. The acquisition method as claimed in claim 6, in which the connection setup message further comprises an identification datum of the second domain.

9. The acquisition method as claimed in claim 6, further comprising receiving, from the data server, a message communicating at least one certificate associated with the delegation chain.

10. A method for associating a delegation chain with an information message comprising a network identifier of a data server capable of delivering a content to a terminal, the method being executed by a resolution server of a communication architecture, the resolution server being able to transmit to the terminal the network identifier corresponding to a name of the data server, and the method comprising:

receiving, from the terminal, a message requesting to obtain the network identifier of the data server in a second domain, determining a delegation chain, comprising at least one redirection from the second domain to a first domain, the at least one redirection being received by the resolution server from a name server of the second domain, transmitting an information message, to the terminal, comprising the network identifier of the data server in the first domain, said information message further comprising the determined delegation chain.

11. A device for acquiring a network identifier of a data server capable of delivering a content to a terminal, comprising:

a processor; and a non-transitory computer-readable medium comprising instructions stored thereon which when executed by the processor configure the device to:

receive an information message from a resolution server a communication architecture, the resolution server being a server that is able to transmit to the terminal the network identifier corresponding to a name of the data server, the information message comprising the network identifier of the data server in a first domain, and further comprising a delegation chain, determined by the resolution server, including at least one redirection from a second domain to the first domain, the at least one redirection having been received by the resolution server from a name server of the second domain, and transmit, to the resolution server, a message requesting to obtain the network identifier of the data server in the second domain and trigger reception of the information message.

12. A device for associating a delegation chain with an information message comprising a network identifier of a data server capable of delivering a content to a terminal, wherein the device is able to transmit to the terminal the network identifier corresponding to a name of the data server and is implemented in a communication architecture, the device comprising:

a processor; and a non-transitory computer-readable medium comprising instructions stored thereon which when executed by the processor configure the device to:

receive, from the terminal, a message requesting to obtain the network identifier of the data server in a second domain, determine a delegation chain comprising at least one redirection from the second domain to a first domain, the at least one redirection being received by the resolution server from a name server of the second domain and transmit an information message to the terminal, said message comprising the network identifier of the data server in the first domain, and further comprising the determined delegation chain.

13. A non-transitory computer-readable storage medium comprising instructions stored thereon which when executed by a processor of an acquisition device configure the acquisition device to acquire a network identifier of a data server capable of delivering a content to a terminal, by:

receiving an information message from a resolution server a communication architecture, the resolution server being a server that is able to transmit to the terminal the network identifier corresponding to a name of the data server, the information message comprising the network identifier of the data server in a first domain, and further comprising a delegation chain, determined by the resolution server, including at least one redirection from a second domain to the first domain, the at least one redirection being received by the resolution server from a name server of the second domain, and transmitting, to the resolution server, a message requesting to obtain the network identifier of the data server in the second domain and trigger reception of the information message.

* * * * *